United States Patent Office 2,774,275
Patented Dec. 18, 1956

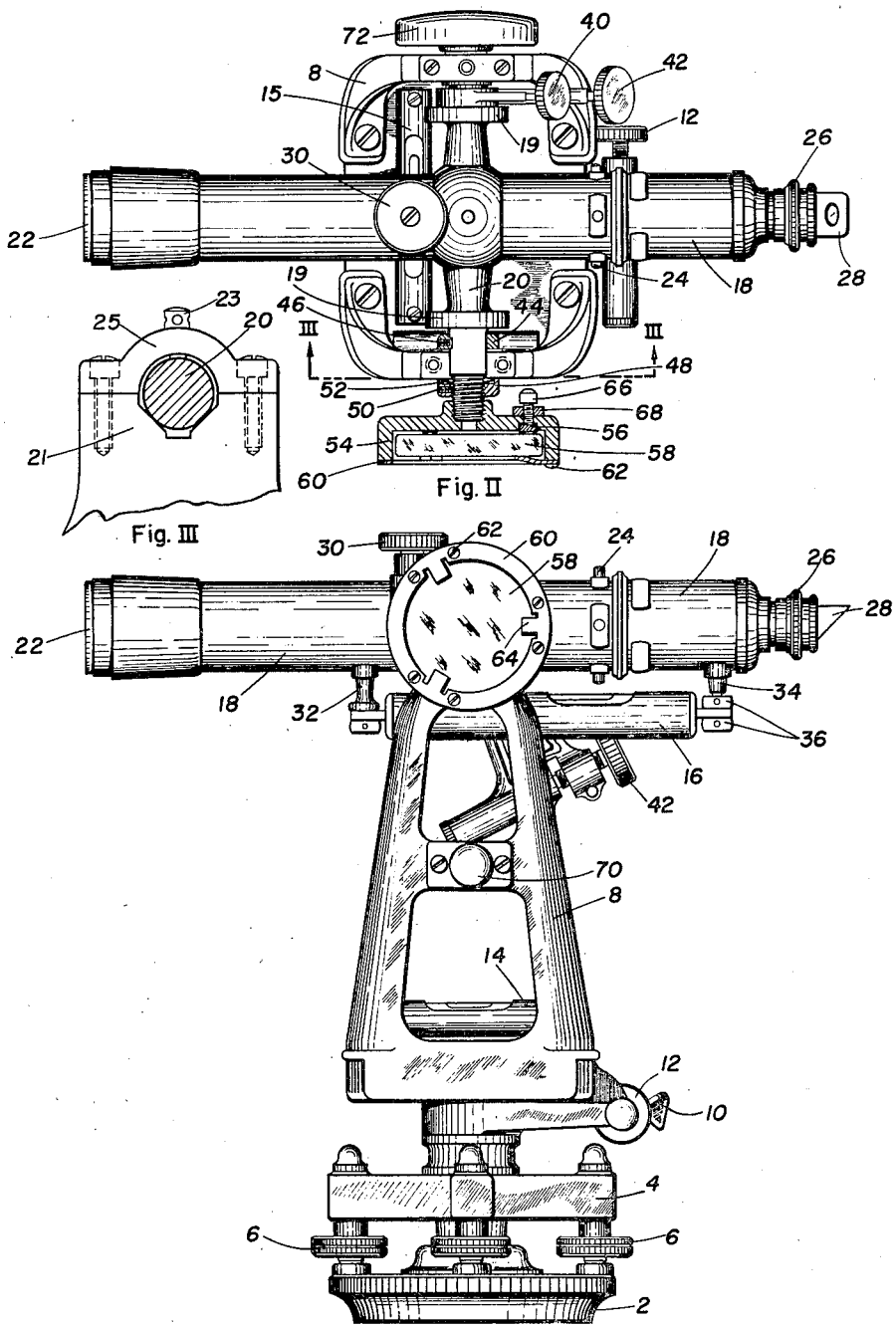

2,774,275

OPTICAL INSTRUMENT

William G. Keller, Summit, N. J., assignor to Keuffel & Esser Company, Hoboken, N. J., a corporation of New Jersey Application May 1, 1952, Serial No. 285,510

1 Claim. (Cl. 88—2.2)

This invention relates to an optical alignment instrument. More specifically it relates to an instrument which is useful in aircraft alignment for locating points in a plane perpendicular to an optical line of sight.

The instrument is generally in the form of a transit although the usual scales need not be provided. A transit is normally made up of a base, a leveling head mounted over the base, an alidade mounted for rotation about a vertical axis with respect to the leveling head and a telescope mounted for rotation about a horizontal axis with respect to the alidade. It has also been suggested to mount a mirror on the side of the standard or alidade to locate a direction perpendicular to the line of sight of the transit telescope.

The principal object of the present invention is to provide an instrument by means of which it is possible to locate a line perpendicular to an optical line of sight or to make an optical line of sight perpendicular to a given line with a greater degree of accuracy than is possible with any prior art instrument.

Another object of the invention is to provide an instrument by means of which it is possible to locate a telescope axis parallel to a given line so that the telescope line of sight mounted perpendicular to the telescope axis will rotate in a plane perpendicular to the given line.

Another object of the invention is to provide an instrument for the above described purposes which is self-checking.

These and other objects of the invention and the means for their attainment will be more fully understood by reference to the following description taken in connection with the accompanying drawing, in which:

Figure I is a view in side elevation of the new instrument.

Figure II is a view in plan and partly in section of the new instrument.

Figure III is a partial view in enlarged sectional side elevation taken along the line III—III of Fig. II and looking in the direction of the arrows.

The instrument is provided with a base 2 which may be internally threaded for mounting on a tripod or any other suitable structure. The leveling head 4 is mounted over the base 2 in conventional manner, for example with a half ball construction, so that it can be tilted in all directions over the base 2. Leveling screws 6 are provided between the base 2 and the leveling head 4 for adjusting the leveling head 4 to make the vertical axis of the instrument truly vertical. Although a four screw leveling head is shown, by way of example, it will be understood that a three screw leveling head may also be used.

The standards 8 of the alidade are mounted for rotation about the vertical axis with respect to the leveling head 4. This may be accomplished in any known manner, for example by means of a tapered spindle fitting in a tapered socket. Clamp and fine adjustment means are provided between the alidade 8 and the leveling head 4. In the embodiment shown, these take the form of the clamp screw 10 and tangent screw 12. The clamp screw 10 may actuate the conventional ring clamp of the shoe type and the tangent screw may be of any conventional construction known in the surveying instrument art. A plate level vial 14 may be provided on the lower part of the alidade 8 to indicate when the vertical axis of the instrument is truly vertical. The telescope level vial 16 may also be used for this purpose. A second plate level vial 15 is provided parallel to the axle 20. The plate level vial 15 may have greater sensitivity than the plate level vial 14 for accurately aligning the axis of the axle 20 horizontally so that the line of sight of the telescope 18 will move in a vertical plane. Another way of accomplishing this is to use a striding level resting on the collars 19 which are accurately turned concentric to the axis of the axle 20. Conventional adjustment means are provided for setting the axis of the plate level vial 14 and the axis of the other plate level vial perpendicular to the axis of rotation of the alidade 8.

The telescope 18 or other optical system for determining an optical line of sight such as a collimator or auto collimator is mounted on the axle 20 for rotation about a horizontal axis with respect to the alidade 8. The horizontal axis of the axle 20 is made perpendicular to the vertical axis of rotation of the alidade. If desired conventional adjustment means may be provided for this purpose. The telescope 18 includes an objective lens 22, a reticle adjustable by means of the screws 24 and an eyepiece 26. An eyepiece prism 28, which may be removable, may also be provided as shown for ease in looking through the telescope when it is in inclined position. By means of the adjustment screws 24 the reticle may be adjusted so that the line of sight through the objective determined thereby is perpendicular to the axis of the axle 20. The telescope 18 may also include a conventional focussing lens operated by a focussing knob 30 and the eyepiece may include means for focussing on the reticle to suit the eye of the observer.

The telescope level vial 16 is mounted below the telescope 18 on the posts 32 and 34. The nuts 36 provide an adjustment for making the axis of the level vial parallel to the line of sight of the telescope so that the level vial may be used for indicating when the line of sight is horizontal. Clamp and fine adjustment means in the form of the conventional clamp and tangent screw operated by the knobs 40 and 42 respectively are provided between the axle 20 and the alidade 8.

As shown in Fig. III, the telescope axle 20 rests in a conventional axle bearing 21, which may be a Y bearing as shown. The axle bearing 21 may be part of the standard 8 or an insert may be provided for the purpose. An adjustable frictional contact 23 may be provided in the axle cap 25 on the top of the axle 20 for applying a predetermined friction to the axle. This friction holds the telescope on the target until the clamp 40 can be locked. Although the construction of the axle bearing is shown for one standard only, it will be understood that the same or an equivalent construction may be used for the other standard. A collar 44 is provided on the axle 20 to prevent axial movement of the axle 20. A set screw 46 is provided to hold the collar 44 in position. Preferably the set screw 46 fits into a recess in the axle for more positive holding action. The outer end of the axle 20 (extending outside the standard 8) is threaded. A threaded collar 48 is screwed onto the end of the axle 20 to compress the spring washer 52 against the standard 8. Pin holes may be provided in the threaded collar 48 so that the collar 48 may be turned with an adjusting pin. The set screw 50 holds the threaded collar 48 in position.

With the construction described above, the telescope axle can be adjusted axially to bring the line of sight of the telescope into the same plane as the vertical axis of the instrument. The telescope is first brought off axis in the direction toward the top of the drawing (Fig. II) with the collar 44 against the inside of the standard 8. The set screw 46 is set to permit sliding of the collar 44 on the axle 20 under the application of a force. The threaded collar 48 is then turned to move the axle 20 and the telescope 23 in the direction which appears downward in Fig. II of the drawing until the line of sight lies in the same plane as the vertical axis of the instrument. Known methods can be used for checking this condition. The set screw 46 is then locked and the threaded collar 48 is backed off slightly. The spring washer 52 holds the collar 44 against the standard 8 to maintain the adjustment.

The reflector mount 54 is screwed onto the end of the axle 20. Three pads 56 are carried in recesses in the reflector mount 54 at 120° intervals. The mirror 58 having a plane reflecting surface is held against the pads 56 by the ring 60 which is held on the mirror mount by the screws 62. The ring 60 is provided with three projections 64 forming leaf springs which act directly opposite the pads 56 holding the mirror 58 in position. Screws 66 are provided behind at least one of the pads 56 (preferably behind two or three) for adjusting the reflecting surface of the mirror 58 perpendicular to the axis of the axle 20. The screws 66 may be provided with adjusting pin holes and nuts 68 also having adjusting pin holes are provided to lock the screws 66 in adjusted position.

It will be understood that the reflecting surface may be provided on either side of the mirror blank 58 which is preferably of polished optical glass. The reflecting surface may be provided in known manner as for example by chemical silvering or by depositing aluminum in a vacuum. Other reflecting means such as a prism may be used for reflecting light parallel to the axis of the axle 20 backward in a direction parallel to itself.

The new instrument may for example be used with an auto-collimator which establishes a reference line of sight. The instrument is set up so that the beam of light from the collimator strikes the mirror 58. By means of the leveling screws 6 and the clamp and tangent screws 10 and 12, the instrument is then adjusted so that the reflected image lines up with the reticle of the auto-collimator. If the mirror is properly adjusted, the axis of axle 20 will then lie parallel to the auto-collimator line of sight and the line of sight of the telescope 18 will swing in a plane perpendicular to the line of sight of the auto-collimator.

The adjustment of the mirror 58 may be checked very readily by looking through the auto-collimator while the telescope 18 is turned about its axle 20. If the reflected image remains in coincidence with the reticle of the auto-collimator, then the mirror is in proper adjustment. If the mirror is not in proper adjustment, the adjustment can be corrected by means of the screws 66. Preferably the instrument is constructed to permit the telescope 18 to transit at least at one end to facilitate this adjustment. For example, the instrument may be adjusted so that the reflected image lines up with the reticle of the auto-collimator with the telescope pointing horizontally in one direction. The telescope may then be transited to point horizontally in the other direction. Half the horizontal difference between the reflected image and the reticle is then taken up by means of the screws 66 and half by means of the tangent screw 12. This procedure can be repeated as many times as is necessary to obtain the desired accuracy in the horizontal plane. The same type of adjustment can be made in the vertical plane by using the other two screws 66 and the leveling screws 6. It may be necessary to recheck the adjustment in the horizontal plane after making an adjustment in the vertical plane.

A pad 70 may be provided on the side of the standard with a ground outer locating surface. The ground outer locating surface of the pad 70 is perpendicular to the axis of the axle 20 and at a predetermined distance from the plane in which the line of sight of the telescope 18 moves. Measurements may be made from the locating surface of the pad 70 to locate the telescope line of sight in a desired plane or to determine the distance from the plane of the telescope line of sight to a reference point. A counterweight 72 may be provided on the other end of the axle 20 to balance the weight of the mirror 58 and its mount 60 to insure smooth turning of axle 20 in its bearings.

Having thus described the invention, what is claimed is:

An instrument for locating points in a plane perpendicular to an optical line of sight comprising a telescope, an axle carrying said telescope, means for adjusting the line of sight of said telescope perpendicular to the axis of said axle, bearings supporting said axle for rotation about its axis, an adjustable standard supporting said bearings, an element having a plane reflecting surface mounted on said axle so that the plane of the reflecting surface is perpendicular to the axis of the axle and thereby parallel to the plane generated by the line of sight of the telescope as the telescope is rotated on its axle, mounting means for the element having a plane reflecting surface for positioning the plane reflecting surface of said element perpendicular to the axis of said axle, the perpendicularity of the plane reflecting surface to the axis of the axle being determinable by rotating the axle while observing through another optical instrument an image reflected from said plane reflecting surface so that any necessary adjustment to secure perpendicularity can be made, whereby points may be located in a plane perpendicular to the optical line of sight of another optical instrument by adjusting said standard to make the axis of said axle parallel to the optical line of sight of the optical instrument as determined by an image on the line of sight of the optical instrument being reflected from said plane reflecting surface backward into the optical instrument and sighting through said telescope carried on said axle while said instrument is so adjusted.

References Cited in the file of this patent

UNITED STATES PATENTS

| | | |
|---|---|---|
| 1,204,694 | Schaff | Nov. 14, 1916 |
| 1,875,829 | Suverkrop | Sept. 6, 1932 |
| 2,405,441 | Martin | Aug. 6, 1946 |
| 2,410,339 | Creagmile | Oct. 29, 1946 |
| 2,436,892 | Hunter | Mar. 2, 1948 |
| 2,475,502 | Holmes | July 5, 1949 |

FOREIGN PATENTS

| | | |
|---|---|---|
| 313,882 | Germany | July 21, 1919 |
| 240,426 | Great Britain | Nov. 19, 1925 |